United States Patent
Kitagawa et al.

(10) Patent No.: US 10,971,775 B2
(45) Date of Patent: Apr. 6, 2021

(54) AIR ELECTRODE, METAL-AIR BATTERY, AND METHOD FOR PRODUCING AIR ELECTRODE

(71) Applicant: SHARP KABUSHIKI KAISHA, Sakai (JP)

(72) Inventors: Tomo Kitagawa, Sakai (JP); Hirotaka Mizuhata, Sakai (JP); Keigo Mitamura, Sakai (JP); Shinobu Takenaka, Sakai (JP); Shunsuke Sata, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 48 days.

(21) Appl. No.: 16/490,272

(22) PCT Filed: Mar. 13, 2018

(86) PCT No.: PCT/JP2018/009779
§ 371 (c)(1),
(2) Date: Aug. 30, 2019

(87) PCT Pub. No.: WO2018/168866
PCT Pub. Date: Sep. 20, 2018

(65) Prior Publication Data
US 2020/0006829 A1    Jan. 2, 2020

(30) Foreign Application Priority Data
Mar. 16, 2017    (JP) .............................. JP2017-051277

(51) Int. Cl.
*H01M 12/08* (2006.01)
*H01M 4/86* (2006.01)
*H01M 12/02* (2006.01)

(52) U.S. Cl.
CPC ......... *H01M 12/08* (2013.01); *H01M 4/8668* (2013.01); *H01M 4/8673* (2013.01); *H01M 12/02* (2013.01); *H01M 2004/8689* (2013.01)

(58) Field of Classification Search
CPC .. H01M 12/08; H01M 4/8668; H01M 4/8673; H01M 12/02; H01M 2004/8689
See application file for complete search history.

(56) References Cited

U.S. PATENT DOCUMENTS

| 2016/0079603 A1* | 3/2016 | Nitta | H01M 4/9033 502/5 |
| 2016/0111730 A1* | 4/2016 | Kim | H01M 8/186 429/405 |
| 2018/0026272 A1* | 1/2018 | Mitamura | H01M 4/583 429/405 |

FOREIGN PATENT DOCUMENTS

JP    H07-201335 A    8/1995

\* cited by examiner

*Primary Examiner* — Stewart A Fraser
(74) *Attorney, Agent, or Firm* — ScienBiziP, P.C.

(57) ABSTRACT

A method for producing an air electrode includes a kneading step of kneading an oxygen reduction catalyst, a conductive auxiliary agent, and a water-repellent resin (binder) in a water solvent; and a rolling step of rolling with a roller the kneaded product produced in the kneading step. The rolling step includes rolling the kneaded product with the roller several times in many directions (at least two or more different rolling directions). In the formed air electrode, the water-repellent resin is fiberized in the air electrode, and the fibers thereof are oriented in many directions to form a netlike shape.

20 Claims, 3 Drawing Sheets

AIR ELECTRODE, METAL-AIR BATTERY, AND METHOD FOR PRODUCING AIR ELECTRODE

TECHNICAL FIELD

The present disclosure relates to an air electrode used for a metal-air battery, a metal-air battery using the air electrode, and a method for producing an air electrode.

BACKGROUND ART

Metal-air batteries are batteries each including an air electrode, a fuel electrode, and an electrolyte and taking out the electric energy obtained by a process of changing a metal (referred to as a "fuel metal" hereinafter) used as fuel to a metal oxide by electrochemical reaction. Examples of typical fuel metals in metal-air batteries include zinc, iron, magnesium, aluminum, sodium, calcium, lithium, and the like.

For example, when the fuel metal is zinc, zinc reacts with hydroxide ions to produce zinc hydroxide and emit electrons at the fuel electrode during discharge. The emitted electrons flow to the air electrode, and the electric current generated thereby becomes the output of a battery. The zinc hydroxide is further decomposed into zinc oxide and water, and the water is returned into the electrolyte. At the air electrode during discharge, oxygen contained in the air and the electrons received from the fuel electrode react with water under the catalyst of the air electrode, producing hydroxide ions. The hydroxide ions reach the fuel electrode by ionic conduction through the electrolyte.

The cycle described above uses the oxygen taken in from the air electrode and uses zinc as the fuel, thereby realizing continuous takeout of electric power while forming zinc oxide.

Such a metal-air battery uses, for example, a porous carbon material as a substrate of the air electrode, and the surface of the substrate is coated with a catalyst for more activating the reaction and a fluorine-based water repellent. The fluorine-based water repellent has the function of improving water repellency of the surface of the substrate and preventing a decrease in characteristics of the air electrode. With the substrate surface having low water repellency, the electrolyte penetrates the air electrode, and thus the reaction area in the air electrode (the area of the three-phase interface between the electrolyte (liquid phase), oxygen (gas phase), and catalyst (solid phase)) is decreased, thereby decreasing characteristics.

Patent Literature 1 discloses a method for producing an air electrode catalyst layer used in a metal-air battery. Specifically disclosed is a method including adding a binder and a fluorocarbon resin powder functioning as a water repellent to a mixed powder containing activated carbon, manganese oxide, and carbon black, adding ethyl alcohol, kneading the resultant mixture, and then molding into a sheet shape having a predetermined thickness by passing several times through two heated rollers.

CITATION LIST

Patent Literature

PTL 1: Japanese Unexamined Patent Application Publication No. 7-201335

SUMMARY OF INVENTION

Technical Problem

In the method for producing an air electrode catalyst layer of Patent Literature 1, even when the fluorocarbon resin powder is dispersed in the kneading step, the fluorocarbon resin powder is fiberized and aggregated in the rolling direction in the subsequent rolling step using the rollers, and thus the water repellency of the air electrode catalyst layer becomes nonuniform. Therefore, a portion where the electrolyte easily permeates is locally present in the air electrode catalyst layer, thereby causing shortening of the life of the air electrode.

In general, in order to compensate a decrease in life of the air electrode due to the nonuniformity of water repellency, the water repellency of the air electrode catalyst layer has been improved by increasing the content of the fluorocarbon resin powder. However, this method has the problem of increasing the electric resistance of the air electrode, leading to a decrease in characteristics of a metal-air battery.

The present discourse has been achieved in consideration of the problem, and an object thereof is to provide an air electrode and a method for producing the same which is capable of making uniform the surface water repellency of an air electrode and improving the life of the air electrode.

Solution to Problem

In order to solve the problem, an air electrode of the present disclosure includes an oxygen reduction catalyst, a conductive auxiliary agent, and a water-repellent resin. The water-repellent resin is fiberized in the air electrode, and the fibers thereof are oriented in many directions to form a netlike shape.

According to the configuration described above, the water-repellent resin contained in the air electrode is oriented in many directions and fiberized in a netlike shape, and thus the water-repellency of the air electrode is made uniform, and the electrolyte can be effectively prevented from permeating the air electrode. As a result, the life of the air electrode can be improved. Also, in comparison with a usual production method, the water-repellency can be improved without increasing the content of the water-repellent resin. Therefore, in comparison with a usual air electrode having the same degree of life, the electric resistance of the air electrode can be decreased by decreasing the content of the water-repellent resin.

In addition, the air electrode preferably contains manganese oxide as the oxygen reduction catalyst. The manganese oxide is more preferably α-type manganese dioxide.

According to the configuration described above, the catalyst activity in the air electrode can be enhanced by using chemical manganese dioxide having an α-type as the oxygen reduction catalyst.

In addition, the α-type manganese dioxide in the air electrode preferably has a particle diameter of more than 50 nm and 15 μm or less.

According to the configuration described above, with the α-type manganese dioxide having a particle diameter of 15

µm or less, an increase in electric resistance of the air electrode can be prevented. In addition, with the particle diameter of more than 50 nm, the number of contacts of the conductive auxiliary agent with one α-type manganese dioxide particle is decreased, and thus a decrease in oxygen reduction activity can be prevented.

Also, the α-type manganese dioxide in the air electrode preferably has an average particle diameter of more than 100 nm and 2 µm or less.

According to the configuration described above, with the α-type manganese dioxide having an average particle diameter of 2 µm or less, the number of contacts of the conductive auxiliary agent with the α-type manganese dioxide is increased, and thus oxygen reduction activity can be improved. In addition, with the average particle diameter of more than 100 nm, aggregation of the α-type manganese dioxide can be suppressed, and thus the number of contacts of the conductive auxiliary agent with the α-type manganese dioxide can be increased, thereby improving oxygen reduction activity.

In addition, the α-type manganese dioxide in the air electrode preferably has a specific surface area of 150 m$^2$/g to 300 m$^2$/g.

In addition, the conductive auxiliary agent in the air electrode is preferably carbon black. The carbon black is more preferably acetylene black.

According to the configuration described above, acetylene black has less surface functional groups and more excellent water repellency than other carbon black, and thus contributes to improvement in durability of the air electrode (suppression of electrolyte permeation).

In addition, the carbon black in the air electrode preferably has an average particle diameter of 20 to 40 nm.

Further, the water-repellent resin in the air electrode is preferably PTFE (polytetrafluoroethylene).

According to the configuration described above, PTFE is easily fiberized by applying shear force from the rollers during rolling, and thus can be preferably used in the air electrode of the present disclosure.

In addition, the PTFE in the air electrode preferably has an average fiber diameter of 100 to 200 nm.

According to the configuration described above, with the PTFE having an average fiber diameter of 200 nm or less, the ionic conduction of the air electrode is not inhibited, and a decrease in battery performance due to an increase in electric resistance of the air electrode can be prevented. Also, with the average fiber diameter of 100 nm or more, a decrease in mechanical strength of the air electrode due to insufficient bonding force can be prevented.

In addition, the weight ratio of the conductive auxiliary agent to the oxygen reduction catalyst in the air electrode is preferably 1.2 to 1.7.

According to the configuration described above, the number of contacts of the conductive auxiliary agent with the oxygen reduction catalyst can be maximized, thereby improving oxygen reduction activity.

Further, the water-repellent resin in the air electrode is preferably 15% to 25% of the total weight of the air electrode.

According to the configuration described above, with the water-repellent resin having a weight of 15% or more, the life of the air electrode can be prevented from being shortened due to the insufficient water repellency. In addition, with the water-repellent resin having a weight of 25% or less, the electric resistance of the air electrode can be prevented from being increased due to an increase in the ratio of PTFE serving as an insulator.

In addition, when the air electrode contains PTFE as the water-repellent resin, the ratio of the average fiber diameter of fibers composed of PTFE to the average particle diameter of the oxygen reduction catalyst is preferably 1/20 to 2 and more preferably 1/10 to 1/5.

According to the configuration described above, the ratio of 1/20 or more can prevent weakening of the bonding force to the oxygen reduction catalyst due to thinning of the PTFE fibers, thereby preventing shortening of the life of the air electrode due to a decrease in mechanical strength. In addition, the ratio of 2 or less can prevent insufficient wetting of the oxygen reduction catalyst with the electrolyte due to covering of the oxygen reduction catalyst with the thick PTFE fibers, thereby preventing a decrease in battery performance due to the inability to form the three-phase interface.

In addition, in the air electrode, the value obtained by dividing the weight ratio of the water-repellent resin in the air electrode by the average fiber diameter of the water-repellent resin is preferably 75 to 250. The value reflects the fiber density of the water-repellent resin.

According to the configuration described above, in the case of the water-repellent resin having a low fiber density, it is possible to prevent the problem of decreasing the life of the air electrode due to the insufficient water repellency. In addition, in the case of the high fiber density, it is possible to prevent the problem of the excessively high water repellency, which decreases the battery performance due to the inability to form the three-phase interface and increases the electric resistance of the electrode.

The metal-air battery of the present disclosure is a metal-air battery including a metal negative electrode and an air electrode, the air electrode being the air electrode described above.

In addition, a method for producing an air electrode of the present disclosure is a method for producing an air electrode including an oxygen reduction catalyst, a conductive auxiliary agent, and a water-repellent resin. The method includes a kneading step of kneading the oxygen reduction catalyst, the conductive auxiliary agent, and the water-repellent resin in a water solvent, and a rolling step of rolling, by using a roller, the kneaded product obtained in the kneading step. In the rolling step, the kneaded product is rolled by the roller in at least two different rolling directions.

According to the configuration described above, in the rolling step, the kneaded product is rolled by the roller in at least two different rolling directions, and thus the water-repellent resin contained in the air electrode is oriented in many directions and fiberized to from a netlike shape. This makes uniform the water-repellency of the air electrode, and thus permeation of the electrolyte into the air electrode can be effectively prevented. As a result, the life of the air electrode can be improved.

In addition, in two different rolling directions in the method for producing the air electrode, the angle formed by the rolling directions is preferably 10° or more and 170° or less.

According to the configuration described above, the angle formed by the rolling directions is 10° or more and 170° or less, and thus the netlike structure of the water-repellent resin can be satisfactorily formed.

In addition, the method for producing the air electrode preferably includes, before, the kneading step, a mixing step of mixing the oxygen reduction catalyst and the conductive auxiliary agent, and in the kneading step, the mixture obtained in the mixing step and containing the oxygen reduction catalyst and the conductive auxiliary agent is preferably kneaded with the water-repellent resin in a water solvent.

In addition, the method for producing the air electrode preferably further includes, before the kneading step, a grinding step of grinding the oxygen reduction catalyst.

Advantageous Effects of Invention

In an air electrode and a method for producing the air electrode of the present disclosure, a water-repellent resin contained in the air electrode is oriented in many directions and is fiberized to form a netlike shape. Therefore, the water repellency of the air electrode is made uniform, thereby exhibiting an effect that it is possible to effectively prevent permeation of an electrolyte into the air electrode and to improve the life of the air electrode.

BRIEF DESCRIPTION OF DRAWINGS

FIG. 2(a) shows a SEM (Scanning Electron Microscope) mage of an air electrode formed by a usual production method (rolling in one direction, and FIG. 2(b) shows a SEM image of an air electrode formed by a production method (rolling in many directions) according to an embodiment of the present disclosure.

DESCRIPTION OF EMBODIMENTS

Embodiment 1

Figure 1:
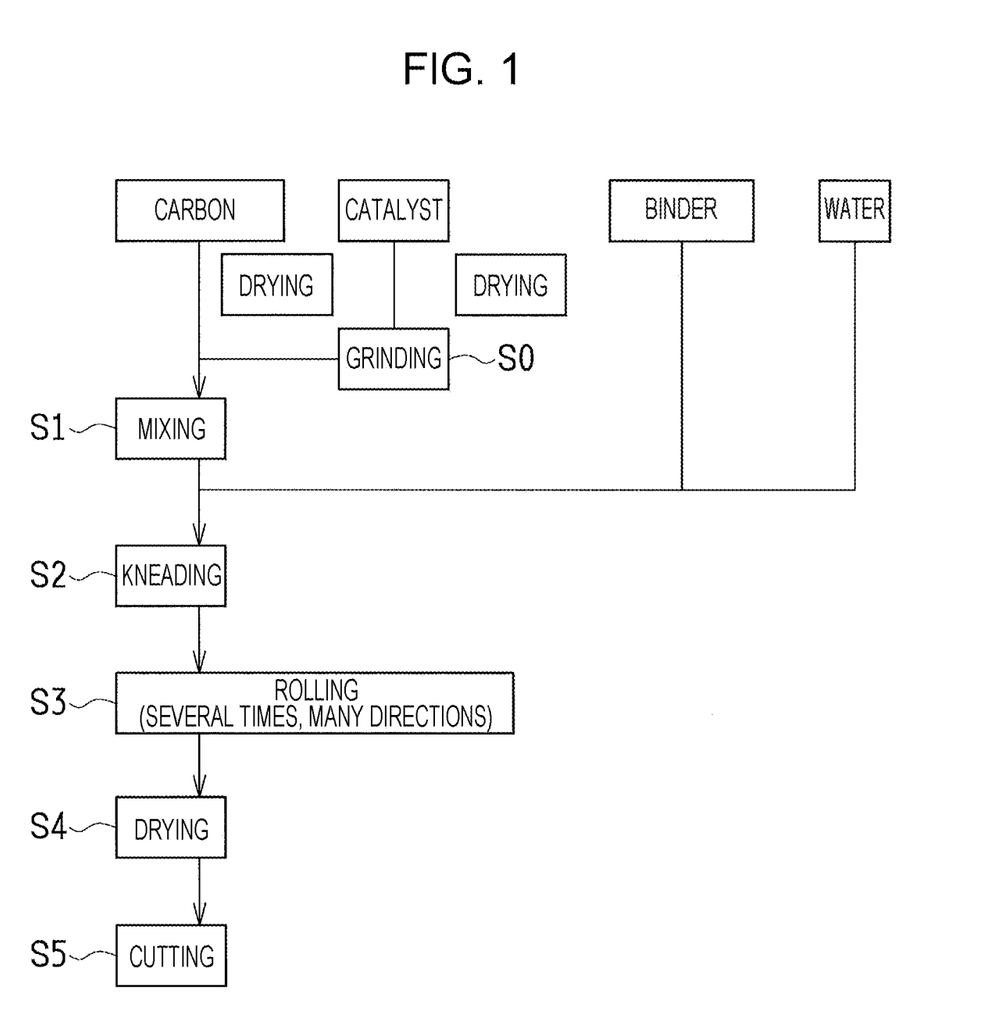
FIG. 1 is a process drawing showing an embodiment of the present disclosure and showing a method for producing an air electrode used in a metal-air battery.

An embodiment of the present disclosure is described in detail below with reference to the drawings. FIG. 1 is a process drawing showing an embodiment of the present disclosure and showing a method for producing an air electrode used in a metal-air battery.

In a mixing step S1, dries (at 80° C. for 15 hours or more) carbon (acetylene black manufactured by Denka Co., Ltd., Denka Black powder) used as a conductive auxiliary agent is mixed with a powder material of an oxygen reduction catalyst (α-type manganese dioxide manufactured by Chuo Denki Kogyo Co., Ltd., CMD-K200). The mixing ratio of carbon to the oxygen reduction catalyst is 3:2 in terms of weight ratio.

The mixing step S1 is performed by using a rotary vessel-type or fixed vessel-type mixer or a grinder, and the powder material is placed in the mixer and mixed. Examples of the rotary vessel-type mixer include a V blender, and examples of the fixed vessel-type mixer include a Henschel mixer, a super mixer, and the like. The mixing step S1 preferably includes uniformly mixing carbon and the catalyst, which have different specific gravities, and thus a stirrer, the fixed vessel-type mixer using air flow blowing, or the grinder may be used. By using the stirrer, the fixed vessel-type mixer, or the grinder, the conductive auxiliary agent is mixed with the oxygen reduction catalyst while the oxygen reduction catalyst is finely ground.

In particular, when the mixing step S1 uses the mixer such as a V blender, a Henschel mixer, a super mixer, or the like, grinding of the oxygen reduction catalyst may not proceed because of the weak shear force applied to the powder. Therefore, a grinding step S0 of grinding the powder of the oxygen reduction catalyst may be performed before a kneading step S2 described below. In the grinding step S0, the oxygen reduction catalyst is placed in the grinder and ground to decrease the particle diameter of the oxygen reduction catalyst. A grinder using a grinding method of a roll type, a medium type, a high-speed rotational impact type, or an air flow type can be used as the grinder. Examples of the roll-type grinder include a roller mill and the like; examples of the medium-type grinder include a ball mill and the like; examples of the high-speed rotational impact-type grinder include a hammer mill and the like; and examples of the air flow-type grinder include a jet mill and the like. Among these, the jet mill using a gas as a grinding medium and having the low probability of impurity contamination caused by the grinding medium is preferably used. Usable examples of the jet mill include SJ-100 manufactured by Nisshin Engineering Inc., CGS-10 manufactured by NETZSCH Inc., and the like. When the particle diameter of the oxygen reduction catalyst is decreased in the grinding step S0 before the mixing step S1 or the kneading step S2, the contact area between the oxygen reduction catalyst and the conductive auxiliary agent can be increased, and thus oxygen reduction activity can be improved.

For example, the oxygen reduction catalyst (α-type manganese dioxide CMD-K200 manufactured by Chuo Denki Kogyo Co., Ltd.) has an average particle diameter of 10 µm, but when the oxygen reduction catalyst is ground in the grinding step S0 using SJ-100 manufactured by Nisshin Engineering Inc., the average particle diameter of the oxygen reduction catalyst after grinding is 1.5 µm. Then, when super mixer SMV-20 manufactured by Kawata Mfg. Co., Ltd. is used in the mixing step S1, the average particle diameter of the oxygen reduction catalyst after mixing is substantially the same as before mixing. When super mixer SMV-20 manufactured by Kawata Mfg. Co., Ltd. is used for the oxygen reduction catalyst in the mixing step S1, the average particle diameter of the oxygen reduction catalyst after mixing is 9 µm, while when the oxygen reduction catalyst is ground while being mixed with carbon in a ball mill serving as a medium-type grinder, the average particle diameter of the oxygen reduction catalyst is 2 µm.

In the kneading step S2, a binder (PTFE (polytetrafluoroethylene) manufactured by Daikin Industries, Ltd.) dispersed solution (60 wt % PTFE) and pure water are added to the powder material prepared in the mixing step S1, and kneaded by a twin-shaft kneader. The mixing ratio of powder material to the binder is 3:1 in terms of weight ratio.

In the rolling step S3, first a lump of the kneaded product formed in the kneading step S2 is rolled by a rolling mill to form a sheet shape having a predetermined thickness (for example, 3 mm). The load in rolling is preferably 0.5 ton or more and 30 ton or less. With the load of less than 0.5 ton, uniform thinness up to a desired target cannot be obtained due to the elasticity possessed by the air electrode, while with the load exceeding 30 ton, cracks or breakage may occur in the air electrode. Further, the sheet-shaped kneaded product having a predetermined thickness is rolled several times with the roller in many directions, finally forming a sheet shape having a desired thickness (for example, 0.6 mm).

As an example, the thickness is decreased from 3 mm to 1.6 mm at intervals of 200 µm in a first rolling stage, decreased from 1.6 mm to 1 mm at intervals of 100 µm in a second rolling stage, and then from 1 mm to 0.6 mm at intervals of 50 µm in a third rolling stage. In each of the rolling stages, rolling is performed in one direction (reciprocating), and the rolling direction is rotated by 90° when the first stage is transferred to the second stage and when the second stage is transferred to the third stage.

In the example, the roller rolling direction (reciprocating) is rotated by 90° each time, and thus the roller rotation directions are two directions including the first rolling direction in the first and third stages and the second rolling direction in the second stage. However, the many rolling directions of the present disclosure are not limited to these directions as long as the roller rolling directions are at least two or more directions.

In addition, in the two different rolling directions, the angle formed by the rolling directions is not limited to 90° as in the example described above as long as it is within a range of 10° or more and 170° or less. When the angle formed by the rolling directions is less than 10° or exceeds 170°, the netlike structure of the water-repellent resin may not be satisfactorily formed.

In a drying step S4, the sheet-shaped kneaded product formed in the rolling step S3 is heated to 60° C. at normal pressure over 10 hours, further maintained for 3 hours, and then allowed to cool. In a cutting step S5, the kneaded product after drying is cut into a desired size, producing an individual air electrode used in a metal-air battery.

In the air electrode produced by the production method described above, the water-repellent resin (PTFE) used as the binder is fiberized by the shear force received in the rolling step S3. In addition, the roller rolling directions in the rolling step S3 are many directions, and thus the fibers of the water-repellent resin are also extended in many directions, forming a netlike shape of the fibers.

Figure 2:
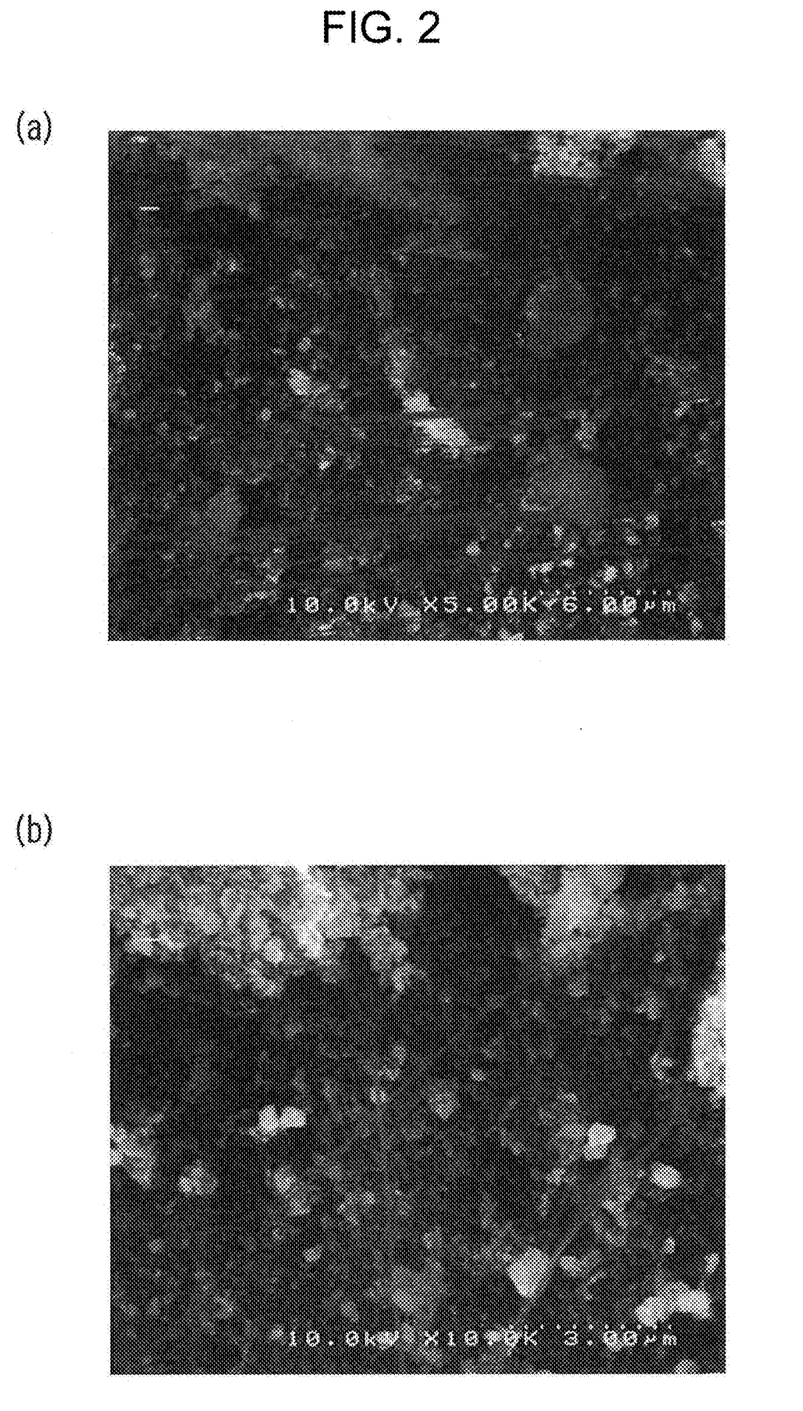

FIG. 2(a) shows a SEM (Scanning Electron Microscope) mage of an air electrode formed by a usual production method (rolling in one direction, and FIG. 2(b) shows a SEM image of an air electrode formed by the production method (rolling in many directions) according to the embodiment of the present disclosure. The SEM images were photographed by using a scanning electron microscope S-4800 manufactured by Hitachi High-Technologies Corporation. In these SEM images, a portion seen to be fibrous corresponds to the water-repellent resin. Therefore, it can be confirmed that in the case of rolling in one direction, the fiber direction of the water-repellent resin is one direction, while in the case of rolling in many directions, the fibers of the water-repellent resin are extended in many directions to form a netlike shape.

Thus, when the water-repellent resin contained in the air electrode is oriented in many directions and fiberized to form a netlike shape, the water repellency of the air electrode is made uniform, and permeation of the electrolyte into the air electrode can be effectively prevented. As a result, the life of the air electrode can be improved. In addition, in comparison with a usual production method, the water repellency can be improved without increasing the content of the water-repellent resin. Therefore, in comparison with a usual air electrode having the same degree of life, the electric resistance of the air electrode can be decreased by decreasing the content of the water-repellent resin.

(Tensile Experiment)

A tensile experiment was actually performed by using an air electrode formed by rolling in one direction according to a usual production method and an air electrode formed by rolling in many directions according to the embodiment 1.

Each of the air electrode formed by rolling in one direction according to a usual production method and the air electrode formed by rolling in many directions according to the embodiment 1 was cut into 10 specimens of a size of 40 mm×5 mm so that the directions of the long sides of the specimens were different from each other. Each of the specimens was fixed at 10-mm portions at both ends, and a tensile test was performed by using a small desk-top tester (EZ Graph) at a tensile speed of 5 mm/min to measure displacement until fracture. As a result, comparison of minimum displacement until fracture of the specimens between the air electrode formed by rolling in one direction and the air electrode formed by rolling in many directions indicated that the minimum displacement of the air electrode formed by rolling in many directions is 2 times that of the air electrode formed by rolling in one direction.

(Wettability Evaluation Experiment)

Also, as a result of a wettability evaluation experiment performed by dropping 0.5 µl of a 7 mol/L aqueous potassium hydroxide solution to the air electrode formed by rolling in one direction according to a usual production method and the air electrode formed by rolling in many directions according to the embodiment 1, the air electrode formed by rolling in many directions had a larger contact angle than the air electrode formed by rolling in one direction. In the wettability evaluation test, the aqueous potassium hydroxide solution was dropped to a specimen, and 1 minute after, the contact angle was measured by using a photograph taken with digital microscope VHX500 manufactured by Keyence Corporation.

Therefore, it is considered that in the case of forming by rolling in many directions, the water-repellent resin is oriented in many directions and fiberized to form a netlike shape, thereby increasing the tensile strength and increasing the contact angle due to improvement in water repellency.

(Life Measurement Experiment)

As a result of an actual life measurement experiment performed for the air electrode formed by rolling in one direction according to a usual production method and the air electrode formed by rolling in many directions according to the embodiment 1, the confirmed improvement in life of the air electrode formed by rolling in many directions was about 1.8 to 3.7 times that of the air electrode formed by rolling in one direction. In the experiment, the air electrode formed by rolling in one direction and the air electrode formed by rolling in many directions were produced by the same steps except the rolling step and had the same thickness. In the experiment, a metal-air battery including a metal negative electrode (using a zinc negative electrode), an electrolyte (using an aqueous KOH solution), and an air electrode was discharged, and the time when the discharge voltage of the battery was lower than 90% of the initial voltage at the start of the experiment was measured as the life. In the air electrode formed by rolling in one direction, ooze-out of the electrolyte from the air-inlet side was confirmed by visual observation at the time when the discharge voltage was lower than 90% of the initial voltage, while in the air electrode produced by rolling in many directions, ooze-out of the electrolyte was not confirmed at the same elapsed time. It is considered that in the air electrode formed by rolling in one direction, the three-phase interface cannot be formed due to ooze-out of the electrolyte, and thus the characteristics of the air electrode are decreased.

It was also confirmed that the life obtained by the air electrode formed by rolling in many directions with a PTFE content of 20% in terms of weight ratio is, in spite of decreasing the PTEE content to 2/3, 1.6 times the life obtained by the air electrode formed by rolling in one direction with a PTFE content of 30% in terms of weight ratio. This is considered to be due to the fact that rolling in many directions causes PTFE to be oriented in many directions and fiberized to form a netlike shape and makes the water repellency uniform, thereby improving the life even when the PTEE content is decreased.

Embodiment 2

In an embodiment 2, the materials used for the air electrode of the present disclosure are described in further detail.

(Conductive Auxiliary Agent)

The conductive auxiliary agent is carbon, an oxide such as Sb-doped $SnO_2$, or the like, which is used as the conductive auxiliary agent for air electrodes, and basically the type thereof is not particularly limited as long as it is generally used in the battery technical field. However, carbon black c pan be preferably used as the conductive auxiliary agent, and acetylene black can be particularly preferably used. The acetylene black has less surface functional groups and is richer in water repellency than other carbon black, and thus contributes to improvement in durability of the air electrode (suppression of electrolyte permeation). In addition, the carbon black preferably has an average particle diameter of 20 to 40 nm. With the average particle diameter of 20 nm or less, micropores are excessively developed, and permeation of the electrolyte may be promoted. With the average particle diameter of larger than 40 nm, the speed of two-electron reduction reaction taking place on the carbon black cannot be gained due to a decrease in the specific surface area of carbon black, and thus the discharge voltage may be decreased. The average particle diameter of the conductive auxiliary agent can be determined by measuring the primary particle diameters of the conductive auxiliary agent observed within a viewing field using scanning electron microscope S-4800 manufactured by Hitachi High-Technologies Corporation and averaging the measured values. The conductive auxiliary agent has higher electron conductivity than the oxygen reduction catalyst, and thus in a SEM image, the black dark particle material can be discriminated as the conductive auxiliary agent, and the gray bright charged-up particle material can be discriminated as the oxygen reduction catalyst.

(Oxygen Reduction Catalyst)

The oxygen reduction catalyst is a catalyst contained for more activating the reaction in the air electrode during discharge of the metal-air battery, and the type thereof is not particularly limited as long as it is generally used in the battery technical field. However, manganese oxide can be preferably used as the oxygen reduction catalyst, and α-type manganese dioxide can be particularly preferably used. The order of oxygen reduction activity of manganese dioxide is α-type>β-type>λ-type>γ-type, and chemical manganese dioxide having the α-type is preferably used from the viewpoint of catalyst activity. The α-type manganese dioxide has a three-dimensional connection of $MnO_6$ octahedra and contains a space called a "2×2 tunnel" in a crystal. The γ-type manganese dioxide has a three-dimensional connection of $MnO_6$ octahedra and contains two spaces called a "1×1 tunnel" and a "1×2 tunnel" in a crystal.

When the α-type manganese dioxide is used as the oxygen reduction catalyst, the particle diameter is preferably 50 nm to 15 μm. With the particle diameter exceeding 15 μm, the resistance of the air electrode is increased due to the low electron conductivity of α-type manganese dioxide. While with the particle diameter of smaller than 50 nm, the number of contacts of the conductive auxiliary agent with one α-type manganese dioxide particle is decreased, thereby decreasing oxygen reduction activity. This is due to the fact that two-electron reduction takes place on manganese oxide after two-electron reduction on the conductive auxiliary agent, and thus the catalyst activity is influenced by the number of contacts between manganese oxide and the conductive auxiliary agent.

When the α-type manganese dioxide is used as the oxygen reduction catalyst, the average particle diameter is preferably 100 nm to 2 μm. With the α-type manganese dioxide having an average particle diameter of 2 μm or less, the number of contacts between the α-type manganese dioxide and the conductive auxiliary agent is increased, and thus oxygen reduction activity can be improved. With the average particle diameter of 100 nm or more, aggregation of the α-type manganese dioxide, which easily aggregates due to the large specific surface area, can be suppressed. As a result, the number of contacts between the α-type manganese dioxide and the conductive auxiliary agent is increased, and thus oxygen reduction activity can be improved.

When the γ-type manganese dioxide is used as the oxygen reduction catalyst, the average particle diameter is preferably 20 to 100 nm. With the average particle diameter of larger than 100 nm, the specific surface area is decreased, and thus oxygen reduction activity is decreased because the catalyst activity of γ-type manganese dioxide is inferior to that of α-type manganese dioxide. With the average particle diameter of small than 20 nm, when mixed with the conductive auxiliary agent, the γ-type manganese dioxide aggregates due to the excessively small particle diameter, and thus the number of contact points with the conductive auxiliary agent is decreased, thereby decreasing oxygen reduction activity. In this case, the particle diameter and average particle diameter of an oxygen reduction catalyst single material were measured by Laser Micron Sizer LMS-2000e manufactured by Seishin Enterprise Co., Ltd. using water as a dispersion medium. Also, like in the conductive auxiliary agent, the particle diameter and average particle diameter of the oxygen reduction catalyst contained in the air electrode can be measured by image analysis of a SEM image photographed by using scanning electron microscope S-4800 manufactured by Hitachi High-Technologies Corporation.

When the α-type manganese dioxide is used as the oxygen reduction catalyst, the specific surface area is preferably 150 $m^2$/g to 300 $m^2$/g. With the specific surface area of less than 150 $m^2$/g, the oxygen reduction activity of the air electrode may be decreased, while with the specific surface area of more than 300 $m^2$/g, when mixed with the conductive auxiliary agent, the α-type manganese dioxide aggregates due to the excessively small particle diameter, and thus the number of contact points with the conductive auxiliary agent is decreased, thereby decreasing oxygen reduction activity. The specific surface area of the oxygen reduction catalyst was measured by using nitrogen adsorption measuring apparatus NovaWin 2 manufactured by Quantachrome Corporation.

(Binder)

The binder has the function of bonding the conductive auxiliary agent and the oxygen reduction catalyst and in addition functions as a water repellent agent which imparts water repellency to the air electrode. Therefore, a fluorine-based resin, which is a water-repellent resin, is preferably used as the binder, and PTFE (polytetrafluoroethylene) is particularly preferably used. PTFE is easily fiberized by applying a shear force from the roller in the rolling step S3 and thus can be preferably used for the air electrode of the present disclosure.

In addition, the fiberized PTFE in the air electrode preferably has an average fiber diameter of 100 to 200 nm. With the average fiber diameter exceeding 200 nm, the electron conduction of the air electrode is inhibited, and thus the electric resistance of the air electrode is increased, and the battery performance is also decreased. While with the average fiber diameter of less than 100 nm, the bonding force becomes insufficient, and thus the mechanical strength of the air electrode is decreased. The average fiber diameter of PTFE was determined by performing, in 10 different viewing fields, the operation of measuring the fibers present in a viewing field of 6.4×4.8 µm and calculating an average value while observing the air electrode at 20,000 times using scanning electron microscope S-4800 manufactured by Hitachi High-Technologies Corporation, and then calculating a total average.

The weight ratio of the conductive auxiliary agent to the oxygen reduction catalyst is preferably 1.2 to 1.7. Within the numerical value range, the number of contacts between the oxygen reduction catalyst and the conductive auxiliary agent can be maximized, and the oxygen reduction activity can be improved. This is because, for example, when manganese oxide is used as the oxygen reduction catalyst, two-electron reduction takes place on the manganese oxide after two-electron reduction on the conductive auxiliary agent, and thus catalyst activity is influenced by the number of contacts between the manganese oxide and the conductive auxiliary agent.

In addition, the weight ratio of the water-repellent resin as the binder is preferably 15% to 25% of the total weight of the air electrode. When the weight of the water-repellent resin is less than 15%, water repellency becomes insufficient, and permeation of the electrolyte into the air electrode results in shortening of the life of the air electrode. On the other hand, with the weight ratio of more than 25%, the ratio of PTFE serving as an insulator is increased, increasing the electric resistance of the air electrode.

In addition, with respect to the fiberized PTFE in the air electrode, the ratio of the average fiber diameter of the PTFE to the average particle diameter of the oxygen reduction catalyst is preferably 1/20 to 2 and more preferably 1/10 to 1/5. When the ratio of the average fiber diameter of PTFE to the average particle diameter of the oxygen reduction catalyst, which is the largest constituent material in the air electrode, is lower than 1/20, PTFE thin fibers have weak bonding force to the oxygen reduction catalyst, and thus the mechanical strength of the air electrode is decreased, shortening the life. On the other hand, with the ratio of more than 2, the oxygen reduction catalyst is coated with PTFE thick fibers, and thus the oxygen reduction catalyst is not sufficiently wetted with the electrolyte, and the three-phase interface cannot be formed, thereby decreasing the battery performance.

In addition, the value obtained by dividing the weight ratio of the water-repellent resin, used as the binder in the air electrode, by the average fiber diameter of the water-repellent resin is preferably 75 to 250. This value reflects the fiber density of the water-repellent resin. When the water-repellent resin has a low fiber density, the life of the air electrode is decreased due to the poor water repellency. On the other hand, with the high fiber density, the excessively high water-repellency causes the problem of decreasing the battery performance due to the inability to form the three-phase interface and enhancing the electric resistance of the electrode.

Embodiment 3

Figure 3:
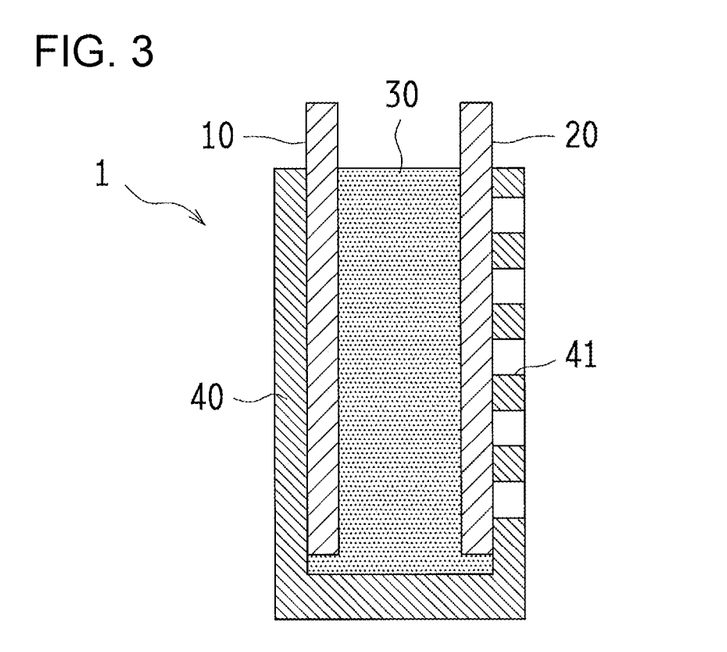
FIG. 3 is a sectional view showing a schematic configuration of a metal-air battery.

In an embodiment 3, a metal-air battery using the air electrode of the present disclosure is described. FIG. 3 is a sectional view showing a schematic configuration of a metal-air battery.

A metal-air battery 1 shown in FIG. 3 has a structure in which a metal negative electrode 10 and an air electrode 20 are disposed in a battery case 40 filled with an electrolyte 30. The metal negative electrode 10 and the air electrode 20 are disposed in parallel with each other in the state of being at least partially immersed in the electrolyte 30. The metal negative electrode 10 contains a metal serving as a negative electrode active material. The air electrode 20 is used as a positive electrode during discharge.

In addition, the air electrode 20 is provided so that the oxygen gas contained in the air can be diffused. For example, the air electrode 20 can be provided so that a portion of the surface of the air electrode 20 is exposed to the air. In the metal-air battery shown in FIG. 3, an air inlet 41 is provided in the battery case 40 so that the oxygen gas contained in the air can be diffused in the air electrode 20 through the air inlet 41. In addition, water may be supplied to the air electrode 20 through the air inlet 41.

The air electrode described in the embodiment 1 can also be directly used alone as the air electrode 20 in FIG. 3. On the other hand, as shown in FIG. 4, an air electrode current collector 21 and an air electrode catalyst layer 22 can be used in combination as the air electrode 20.

The air electrode current collector 21 is preferably made of a porous material having electron conductivity. When an alkaline aqueous solution is used as the electrolyte 30, a material produced by nickel-plating the surface of a metal raw material, such as nickel, stainless, or the like, is preferably used from the viewpoint of corrosion resistance. The air electrode current collector 21 can be made porous by using a mesh, an expand metal, a punching metal, a sintered body of metal particles or metal fibers, a foamed metal, or the like.

Figure 4:
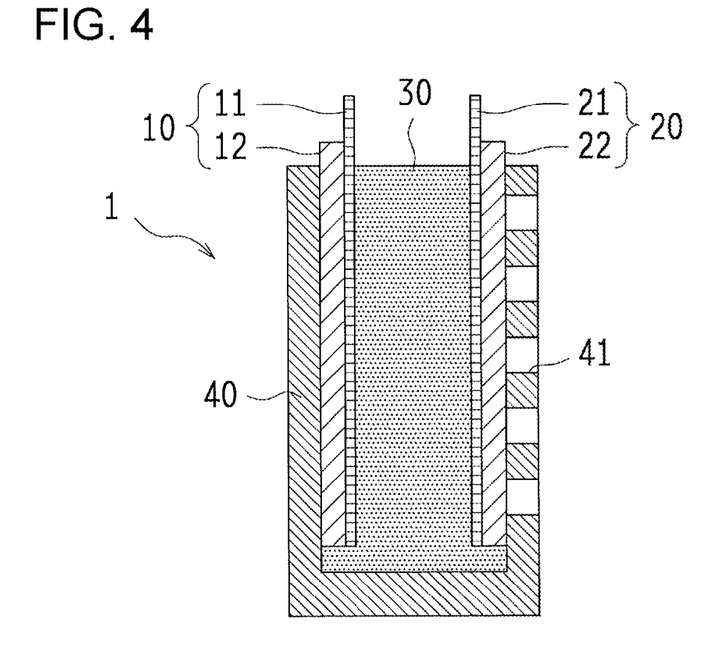
FIG. 4 is a sectional view showing another configuration of a metal-air battery.

When the air electrode 20 including the air electrode current collector 21 and the air electrode catalyst layer 22 is used as shown in FIG. 4, the air electrode described in the embodiment 1 corresponds to the air electrode catalyst layer 22. In other words, this is the concept that an air electrode described in the claims corresponds to either of the air electrode 20 shown in FIG. 3 and the air electrode catalyst layer 22 shown in FIG. 4.

Also, any can be used as the metal negative electrode 10 as long as it is used for usual metal-air batteries and contains a negative electrode active material. Further, as shown in FIG. 4, the metal negative electrode 10 may have a configuration including a negative electrode current collector 11 and a negative electrode active material layer 12. Any can be used as the negative electrode current collector 11 and the negative electrode active material 12 as long as they are used for usual metal-air batteries.

Also, any can be used as the electrolyte 30 as long as it is used for usual metal-air batteries. When zinc is used as the metal negative electrode, a strongly alkaline aqueous solution such as an aqueous potassium hydroxide solution or the like is used. The strongly alkaline aqueous solution has higher permeability than an electrolyte having relatively low pH, electrolyte permeation can be effectively suppressed by using the air electrode described in the embodiment 1.

The metal-air batteries 1 shown in FIG. 3 and FIG. 4 are only examples of the simplest configuration of the metal-air battery to which the present disclosure is applied, and the present disclosure is not limited to these. The air electrode of the present disclosure can be applied to all types of metal-air batteries using an air electrode. For example, the metal-air battery of the present disclosure may be a metal-air secondary battery having, besides the metal negative electrode 10 and the air electrode 20, an oxygen-generating electrode (an electrode serving as a positive electrode during charge).

The present disclosure is not limited to the embodiments described above and can be variously changed within the scope described in the claims, and the technical scope of the present disclosure includes embodiments obtained by appropriately combining technical methods disclosed in different embodiments.

The present international application claims the priority based on Japanese Patent Application No. 2017-051277, filed in Japan Patent Office on Mar. 16, 2017, and the entire contents of Japanese Patent Application No. 2017-051277 are incorporated in the present international application by reference.

REFERENCE SIGNS LIST

1 metal-air battery
10 metal negative electrode
11 negative electrode current collector
12 negative electrode active material layer
20 air electrode
21 air electrode current collector
22 air electrode catalyst layer (air electrode)
30 electrolyte
40 battery case

The invention claimed is:

1. An air electrode comprising
a sheet catalyst layer,
a fiberized water-repellent resin contained in the sheet catalyst layer and oriented in at least two and more directions in the planar direction of the sheet catalyst layer,
an oxygen reduction catalyst bound with the fiberized water-repellent resin, and
a conductive auxiliary agent bound with the fiberized water-repellent resin.

2. The air electrode according to claim 1, wherein the oxygen reduction catalyst is the α-type manganese oxide and,
the α- type manganese dioxide has a particle diameter of 50 nm to 15 μm.

3. The air electrode according to claim 1, wherein
the oxygen reduction catalyst is an α-type manganese oxide and,
the α-type manganese dioxide has an average particle diameter of 100 nm to 2 μm.

4. The air electrode according to claim 1, wherein
the oxygen reduction catalyst is an α-type manganese oxide and,
the α-type manganese dioxide has a specific surface area of 150 m$^2$/g to 300 m$^2$/g.

5. The air electrode according to claim 1, wherein the conductive auxiliary agent is carbon black and,
the carbon black has an average particle diameter of 20 to 40 nm.

6. The air electrode according to claim 1, wherein the fiberized water-repellent resin is polytetrafluoroethylene.

7. The air electrode according to claim 1, wherein the fiberized water-repellent resin has an average fiber diameter of 100 to 200 nm.

8. The air electrode according to claim 1, wherein the weight ratio of the conductive auxiliary agent to the oxygen reduction catalyst is 1.2 to 1.7.

9. The air electrode according to claim 1, wherein the fiberized water-repellent resin is 15 to 25% of the total weight of the air electrode.

10. The air electrode according to claim 1,
wherein the fiberized water-repellent resin is polytetrafluoroethylene; and
the ratio of the average fiber diameter of fiberized water-repellent resin composed of the polytetrafluoroethylene to the average particle diameter of the oxygen reduction catalyst is 1/10 to 1/5.

11. The air electrode according to claim 1, wherein the value obtained by dividing the weight ratio of the fiberized water-repellent resin in the air electrode by the average fiber diameter of the fiberized water-repellent resin is 75 to 250.

12. A method for producing an air electrode comprising:
a kneading step of kneading an oxygen reduction catalyst, a conductive auxiliary agent, and a water-repellent resin in a water solvent; and
a rolling step of rolling with a roller the kneaded product prepared in the kneading step,
wherein the rolling step includes rolling the kneaded product with the roller twice or more times and in different directions.

13. The method for producing an air electrode according to claim 12, wherein in two different rolling directions, the angle formed by the rolling directions is 10° or more and 170° or less.

14. The method for producing an air electrode according to claim 12, comprising, before the kneading step, a mixing step of mixing the oxygen reduction catalyst and the conductive auxiliary agent,
wherein the kneading step includes kneading the mixture, obtained in the kneading step and containing the oxygen reduction catalyst and the conductive auxiliary agent, and the water-repellent resin with a water solvent.

15. The method for producing an air electrode according to claim 12, further comprising, before the kneading step, a grinding step of grinding the oxygen reduction catalyst.

16. The method for producing an air electrode according to claim 12, wherein
a thickness of the kneaded product is gradually decreased in the rolling step.

17. A metal-air battery comprising
a metal negative electrode,
an air electrode arranged opposed to the metal negative electrode and comprising a sheet catalyst layer, a fiberized water-repellent resin contained in the sheet catalyst layer and oriented in at least two directions in the planar direction of the sheet catalyst layer,
an oxygen reduction catalyst bound with the fiberized water-repellent resin, and
a conductive auxiliary agent bound with the fiberized water-repellent resin.

18. The metal-air battery according to claim 17, further comprising an electrolyte disposed between the metal negative electrode and the air electrode, wherein
the electrolyte is alkaline aqueous solution.

19. The metal-air battery according to claim 17, wherein the air electrode comprises an air electrode current collector between the metal negative electrode and the sheet catalyst layer.

20. The metal-air battery according to claim 17, wherein a thickness of the sheet catalyst layer is thicker than a thickness of the air electrode current collector.

* * * * *